US010891373B2

(12) United States Patent
Humphries (10) Patent No.: US 10,891,373 B2
(45) Date of Patent: Jan. 12, 2021

(54) QUARANTINING ELECTRONIC MESSAGES BASED ON RELATIONSHIPS AMONG ASSOCIATED ADDRESSES

(71) Applicant: EntIT Software LLC, Sunnyvale, CA (US)

(72) Inventor: Darren Humphries, Houghton Le Spring (GB)

(73) Assignee: Micro Focus LLC, Santa Clara, CA (US)

( * ) Notice: Subject to any disclaimer, the term of this patent is extended or adjusted under 35 U.S.C. 154(b) by 178 days.

(21) Appl. No.: 15/692,581

(22) Filed: Aug. 31, 2017

(65) Prior Publication Data

US 2019/0065742 A1 Feb. 28, 2019

(51) Int. Cl.
| | | |
|---|---|---|
| *G06F 21/56* | (2013.01) | |
| *G06F 21/12* | (2013.01) | |
| *G06N 20/00* | (2019.01) | |
| *G06F 21/55* | (2013.01) | |

(52) U.S. Cl.
CPC ............ *G06F 21/56* (2013.01); *G06F 21/121* (2013.01); *G06F 21/554* (2013.01); *G06N 20/00* (2019.01)

(58) Field of Classification Search
CPC ........ G06F 21/56; G06F 21/121; G06N 20/00
See application file for complete search history.

(56) References Cited

U.S. PATENT DOCUMENTS

| | | | |
|---|---|---|---|
| 7,757,288 B1* | 7/2010 | Khalsa | .................. H04L 63/145 |
| | | | 713/188 |
| 7,890,588 B2 | 2/2011 | Takahashi | |
| 8,315,595 B2 | 11/2012 | Gorman | |
| 8,392,357 B1* | 3/2013 | Zou | .......................... H04L 51/12 |
| | | | 707/602 |
| 8,959,159 B2 | 2/2015 | Vitaldevara | |
| 9,344,449 B2 | 5/2016 | Brown | |
| 2004/0181581 A1* | 9/2004 | Kosco | .................. G06Q 10/107 |
| | | | 709/206 |
| 2004/0260922 A1* | 12/2004 | Goodman | ............... H04L 51/12 |
| | | | 713/154 |
| 2005/0076084 A1* | 4/2005 | Loughmiller | ........ G06Q 10/107 |
| | | | 709/206 |
| 2005/0259645 A1* | 11/2005 | Chen | ................. H04L 29/12066 |
| | | | 370/389 |
| 2006/0031359 A1* | 2/2006 | Clegg | ..................... H04L 51/12 |
| | | | 709/206 |
| 2006/0265459 A1* | 11/2006 | Petry | ................... H04L 41/0816 |
| | | | 709/206 |
| 2007/0005713 A1* | 1/2007 | LeVasseur | ............. H04L 51/18 |
| | | | 709/206 |

(Continued)

OTHER PUBLICATIONS

Kaur, K. et al.; Spam Detection using KNN, Back Propagation and Recurrent Neural Network; http://www.ijert.org/view-pdf/14081/spam-detection-using-knn-back-propagation-and-recurrent-neurel-network ; Sep. 2015; 8 pages.

*Primary Examiner* — Techane Gergiso (57) ABSTRACT

A technique includes determining pairwise relationships among entities associated with a first electronic mail organization and entities associated with a second electronic mail organization. The technique includes controlling receipt of an electronic message originating from a sender associated with the first email organization based on the determined pairwise relationships.

20 Claims, 6 Drawing Sheets

(56) References Cited

U.S. PATENT DOCUMENTS

| | | | |
|---|---|---|---|
| 2007/0050461 A1* | 3/2007 | Petry | G06Q 20/102 709/206 |
| 2007/0079379 A1* | 4/2007 | Sprosts | G06Q 10/107 726/24 |
| 2009/0070448 A1* | 3/2009 | Pearson | H04L 29/12264 709/223 |
| 2009/0182818 A1* | 7/2009 | Krywaniuk | H04L 51/12 709/206 |
| 2009/0313346 A1* | 12/2009 | Sood | G06Q 10/10 709/207 |
| 2010/0017598 A1* | 1/2010 | Rodriguez | H04L 51/28 713/156 |
| 2013/0218999 A1* | 8/2013 | Martin | H04L 51/32 709/206 |
| 2014/0172944 A1* | 6/2014 | Newton | H04L 41/0893 709/202 |
| 2014/0344399 A1* | 11/2014 | Lipstone | H04L 41/509 709/217 |
| 2016/0110340 A1* | 4/2016 | Bojja | G06F 17/275 704/9 |
| 2016/0110343 A1* | 4/2016 | Kumar Rangarajan Sridhar | G06F 17/2715 704/9 |
| 2017/0230323 A1* | 8/2017 | Jakobsson | H04L 51/12 |
| 2017/0251006 A1* | 8/2017 | LaRosa | H04L 63/1425 |
| 2017/0324767 A1* | 11/2017 | Srivastava | H04L 51/12 |
| 2018/0024986 A1* | 1/2018 | Singh | G06F 17/2247 704/9 |

* cited by examiner

QUARANTINING ELECTRONIC MESSAGES BASED ON RELATIONSHIPS AMONG ASSOCIATED ADDRESSES

BACKGROUND

A business enterprise may employ various mechanisms to defend against certain unwanted incoming electronic messages, or emails, such as spam-related emails and malicious emails that contain embedded program code or attachments for purposes of introducing malware (viruses, worms, Trojan horses, and so forth) into the computers of the enterprise. For example, a business enterprise may employ a gateway solution in which incoming emails that are associated with recognized malware are blocked or quarantined. As another example, a business enterprise may employ anti-spam software, which makes use of word associations and sentiment analysis for purposes of detecting and blocking spam emails.

DETAILED DESCRIPTION

A business enterprise may employ a number of solutions to block unwanted incoming emails or at least mitigate the effects of such emails. For example, the business enterprise may use a gateway solution to block or quarantine incoming emails that associated with recognized malware (recognized viruses, Trojan horses, worms, and so forth). However, the gateway solution is effective to the extent that the malware has been previously identified and thus, is recognized. Moreover, the gateway solution may be susceptible to phishing attacks, which make use of obfuscation malware that is specifically designed to defeat the gateways solution.

As another example, the business enterprise may use anti-spam software to block spam-related emails. However, the anti-spam software may be relatively ineffective against targeted attacks in which emails are specifically crafted to be directed to individuals and are not part of mass mailings.

Another solution to prevent or at least mitigate the effects of malicious incoming emails is to train the end users, i.e., the email recipients. In this manner, properly trained employees may delete and not open certain emails based on certain characteristics of the emails. Such techniques, however, may be subject to human error.

In accordance with example implementations that are described herein, an email system includes a man-in-the middle server agent (called a "server agent" herein) that resides between an external email server and an enterprise's internal email server to regulate delivery of incoming emails to the internal server to block, or quarantine, unwanted emails (emails containing embedded malware program code, emails containing uniform resource location (URL) linked to malicious website domains, spam emails, and so forth). Moreover, the server agent may be used in conjunction with other email gateway-based or cloud-based anti-virus and/or anti-spam solutions. In general, the server agent may apply a set of rules to identify potentially unwanted emails. In this manner, application of the rules by the server agent may be used to identify, or flag, incoming emails that contain (according to the rules as applied) suspicious attachments, suspicious URL links, embedded program code, and so forth. The server agent may then apply machine learning-based classification for purposes of assigning a relationship classification to emails that are flagged by the application of the rules, and based on this relationship classification, the server agent may take one or multiple actions, such as isolating, or quarantining, the email temporarily to allow testing to be performed on the message body and/or attachment(s) of the email, as well as potentially permanently blocking the email message from passing through to the intended recipient(s).

As described herein, the relationship classification may be determined based on relationships among pairs of email addresses associated with the sender's and recipient's email domains. In this manner, based on a plurality of relationships between a plurality of electronic message addresses associated with a first domain and a plurality of electronic message addresses associated with a second domain, the server agent may determine a classification score so that the server agent isolates, or quarantines, the email based on the score (the server agent quarantines the email if the score is below a predetermined threshold, thereby indicating that relationship is relatively weak, for example). In this context, the "quarantining" refers to either taking one or multiple actions to restrict at least some content (an embedded URL link or attachment, as examples) associated with the email from reaching its recipient, or allowing the email in its entirety to reach the recipient (without any actions to restrict the email content from reaching the recipient).

When an email is quarantined, an attachment and/or message body associated with the email may be prevented from reaching the intended recipient. The server agent may cause the attachment and/or email body to be placed in isolation (in a sandbox, for example) for further testing or analysis, and the server agent may generate a second email message to notify the intended recipient(s) of the quarantining of the first email. Based on the results of the testing in the sandbox, the message body and/or attachment may or may not be eventually forwarded to the recipient(s).

Figure 1:
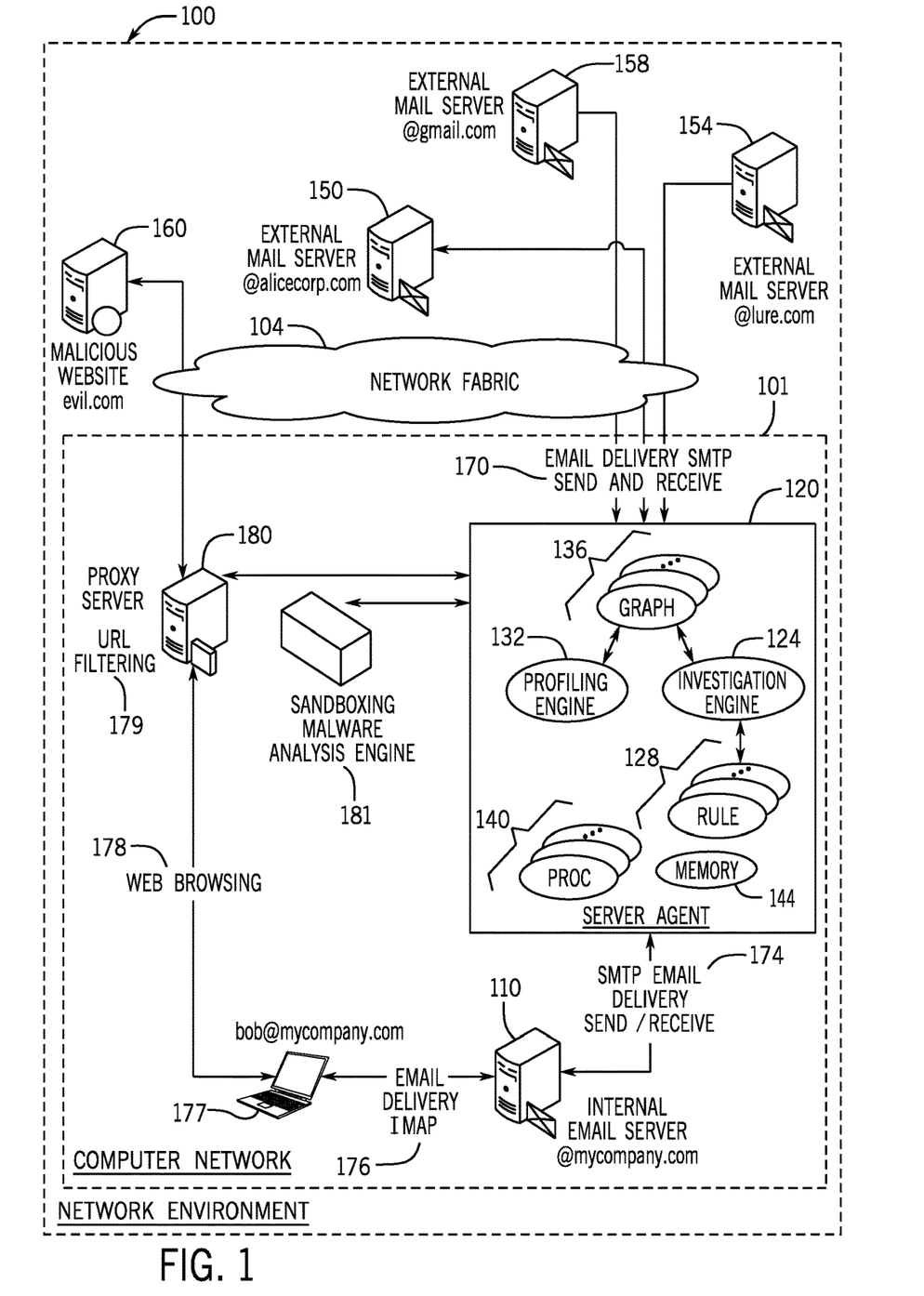
FIG. 1 is a schematic diagram of a network environment according to an example implementation.

FIG. 1 generally depicts a network environment 100 in accordance with example implementations. In general, the network environment 100 includes machines (network switches, private network servers, desktop computers, laptop computers, and so forth) that are part of a private computer network 101 for a particular business enterprise. In this manner, these machines may include an internal email server 110 that may use a Simple Mail Transfer Protocol (SMTP) delivery 174 for purposes of communicating emails with email servers outside of the private computer network 101 and may an Internet Message Access Protocol (IMAP) 176 to deliver emails to and receive emails from machines of the network 101.

As depicted in FIG. 1, the private computer network 101 may include one or multiple machines that communicate emails with the internal email server 110, such as an example laptop computer 177. The private computer network 101 may also contain machines directed to filtering web access for the enterprise, such as a proxy server 180 that provides Uniform Resource Location (URL) filtering 179, as further described herein.

Some emails sent to the private computer network 101 from email servers outside of the private computer network 101 as well as Internet-related communications with components outside of the private computer network 101 may be subject to various security intrusions, such as viruses, malware, spam, Trojan horses, worms and so forth. For purposes of protecting the private computer network 101 against such security intrusions and defending against other unwanted emails (spam-related emails, for example), the network 101 may include a man-in-the middle server agent 120.

In accordance with example implementations, the server agent 120 may be formed from one or multiple, physical machines. In this manner, the server agent 120 may contain one or multiple hardware processors 140 (one or multiple central processing units (CPUs), one or multiple CPU processing cores, and so forth) and a memory 144. The sever agent 120, in accordance with example implementations, applies rules 128 to classify certain incoming emails (i.e., emails originating from email sources that are external to the private computer network 101) as being "bad" emails. In this context, a "bad" email refers to an email, which has one or multiple attributes, or characteristics, which are consistent with the email being harmful or otherwise unwanted if the email is allowed to propagate to its intended recipient(s). As examples, the server agent's application of the rules 128 may classify a given incoming email as being a bad email based on a specific domain of the sender of the email, a specific category of attachment of the email, certain text contained in the email message, certain embedded URL links, and so forth. For bad emails, the server agent 120, in accordance with example implementations, applies machine learning-based classification (unsupervised machine learning-based classification, for example) for purposes of assigning a particular relationship classification score to each bad email.

In this manner, in accordance with some implementations, the server agent 120 assigns a relationship score to each bad email. For example, in accordance with some implementations, the server agent may assign a low, medium or high relationship classification (representing a relationship score) to each bad email. In general, a "relationship classification" refers to a strength, or measure, of the relationship between/ among a sender of the email and the intended recipient or recipients of the email. In accordance with some implementations, for a bad email having a relatively large strong classified relationship (a classification of "medium," or "high," as an example), the server agent 120 may allow the email in its entirety to pass to the intended recipient(s); and for a relatively lower classified relationship (a classification of "low," for example), the server agent 120 may isolate, or quarantine, at least a portion of the email (the message body or an attachment, as examples) from reaching the intended recipient(s).

In accordance with some implementations, the server agent 120 may communicate the quarantined portion of the email to a sandboxing malware analysis engine 181. The sandboxing malware analysis engine 181 may then, as examples, execute the embedded code present in the email, execute a file attached to the email, and so forth, for purposes of evaluating whether the email is or is not actually a bad email. In the interim period (while the sandbox malware analysis engine 181 is performing its analysis), the server agent 120 may communicate a message to the intended recipient(s), informing the recipient(s) that a portion or all of the email has been quarantined. In accordance with example implementations, if a bad email (as flagged by the application of the rules 128) is reclassified as not being "bad" as a result of the analysis by the sandboxing malware analysis engine 181, the server agent 120 may then communicate the email in its entirety as part of the SMPT email delivery 174 to the intended recipient(s).

As depicted in FIG. 1, a given email may originate from a variety of sources outside of the private computer network 101, such as an external mail server 158 that is associated with a mass mailing domain. In this context, "a mass mailing domain" refers to a domain (gmail.com or yahoo.com, as examples), which has a relatively larger number of anonymous users, and as such, such as domain may be associated with mass mailing activity (i.e., anonymous users sending out large volumes of unsolicited emails). The emails sources outside of the private computer network 101 may also include one or multiple emails servers, such as an external mail server 150 or 154, which are associated with non-mass mailing domains (alicecorp.com or lure.com, for example). Moreover, as further described herein, based on the results of the sandboxing malware analysis by the sandboxing malware analysis engine 181, the server agent 120 may instruct the proxy server 180 to block access to a classified threat domain, such as malicious website server 160 of FIG. 1 associated with the domain "evil.com."

The external servers 150, 154, 158 and 160 may communicate with the components of the private computer network 101 via network fabric 104. In accordance with example implementations, the network fabric 104 may be formed from components and use protocols that are associated with any type of communication network such as (as examples) Fiber Channel Networks, iSCSI networks, ATA over Ethernet (AoE) networks, HyperSCSI networks, local area networks (LANs), wide area networks (WANs), global networks (the Internet, for example), other protocols or any combination thereof.

In accordance with example implementations, the server agent 120 may include an investigation engine 124 that applies a set of one or multiple rules 128 for purposes of classifying a given email as being a "bad" email. In accordance with example implementations, the investigation engine 124, upon identifying a given email as being a bad email (due to application of the rules), further processes the email based on data representing machine learning-based relationship graphs 136. The graphs 136 may represent relationships between or among email addresses associated with internal domains (in the private computer network 101) and email addresses associated with the external domains (outside of the private computer network 101); and the graphs 136 may represent relationships between or among the internal and external domains. As described herein, the investigation engine 124 may quarantine a bad email and/or perform other actions based on these relationships. For example, in accordance with example implementations, the investigation engine 124 may determine a relationship classification (a score or a class, such as "low," "medium," or "high") among the internal and external domains and quarantine the bad email in response to the relationship classification meeting a predetermined criterion (a score falling below a predetermined threshold or a "low" class being identified for the relationship classification, as examples).

The server agent 120 may further include a profiling engine 132, which, in accordance with example implementations, generates and updates data representing profiles of certain objects (email domains; website domains; email addresses; and so forth); pairwise relationship classifications for pairs of email domains; and pairwise relationship classifications for pairs of email addresses. This data effectively forms graphs 136, describing the relationships and profiles. In this regard, as further described herein, the profiling engine 132 may continually apply unsupervised machine-based classification to update data representing the profiles and the email and domain relationships, as emails are being processed by the server agent 120.

In accordance with some implementations, the investigation engine 124, the sandboxing malware analysis engine 181 and/or the profiling engine 132 may be software-based components, which are formed by the execution of machine executable instructions, or "software," that may be stored, for example, in the memory 144 or other memory of the computer network 101. In this manner, one or multiple processors 140 (or other processors) may execute the machine executable instruction(s) to form the investigation engine 124, the profiling engine 132, and/or the sandboxing malware analysis engine 181. However, in accordance with further example implementations, the investigation engine 124, the profiling engine 132, and/or the sandboxing malware analysis engine 181 may be dedicated hardware components that are not formed by executing machine executable instructions, such as, for example, Application Specific Integrated Circuits (ASICs) or Field Programmable Gate Arrays (FPGAs).

The memory 144 is a non-transitory memory that may include semiconductor storage devices, magnetic storage devices, optical storage devices, phase change storage devices, memristors, non-volatile memory devices, volatile memory devices, memory devices associated with other storage technologies, a combination of memory devices formed from one or more of the foregoing storage device technologies, and so forth.

In accordance with example implementations, the profiling engine 132 trains relationship heuristics by using observed, or historical, email data to determine existing relationships between the internal email domains (the email domains associated with the private computer network 101) and external email domains (email domains outside of the private computer network 101). In accordance with example implementations, an internal domain may be "mycompany.com," (i.e., the email users associated with the private computer network 101 have email addresses ending in "@mycompany.com"), and for the following examples, the emails sent from senders associated with external domains are subject to the heuristics. The profile engine 132 determines the relationship heuristics, in accordance with example implementations, by determining historical pairwise relationships between "objects." The objects may be, as examples, the sender, the sender's full email address, the email recipients, the email recipients' full email addresses, and so forth.

In accordance with example implementations, the pairwise relationships may be one way or two way relationships, and the strength and classification of the relationships may be determined by the profiling engine 132 as follows. A first type of relationship is a send/receive relationship in which there is one sender and one receiver. For example, an email may be sent from an email sender=alice@alicecorp.com (via external server 150) to an email recipient=bob@mycompany.com, and for this example, no further email correspondence has taken place. As such, this is a one way relationship. In general, the profiling engine 132 may associate a one way relationship with a relatively lower relationship classification or score (also called a "weight" herein).

As another example, an email may be sent from an email sender=alice@alicecorp.com to an email recipient=bob@mycompany.com, and a reply may be sent back from bob@mycompany.com to alice@alicecorp.com. This is a two way relationship. In general, the profiling engine 132 may associate a two way relationship with a higher relationship classification or weight (relative to the one way relationship).

The profiling engine 132, in accordance with example implementations, assigns a strength to the relationships, and this strength may be important for machine learning elements. For example, if multiple emails are sent between alice@alicecorp.com and bob@mycompany.com either by replying or by creating a new email message, then such a two way relationship is deemed to have a higher strength, in accordance with example implementations.

Another type of relationship is a send/receive relationship in which there is one sender and multiple recipients. For example, for a particular email, the sender address may be alice@alicecorp.com, and the email may be sent to the following email recipients: bob@mycompany.com; steve@mycompany.com and other recipients at the mycompany.com domain. As such, the profiling engine 132 may assign a higher relationship weight between alice@alicecorp.com and multiple email addresses @mycompany.com than the weight assigned to a one way relationship without the one sender and multiple recipient relationships.

If multiple emails are sent between alice@alicecorp.com to multiple email addresses @mycompany.com, either by replying or by sending new emails, then, in accordance with example implementations, a two way relationship between alice@alice.com and an address at mycompany.com is deemed to have a higher weight than the weight for a two way relationship without this multiple email address consideration.

The profiling engine 132 may consider additional factors in determining a relationship, such as a context of the relationship and the type of content associated with the email. The "type of content" may refer to, for example, the attachment type sent (a .pdf file, for example) and received between pairwise groups and may also include types of embedded message content (Uniform Resource Locators (URLs), for example) that have been sent and received between pairwise groups. The "context" refers to the types of emails sent, as this helps with the adjustment of anti-spam headers.

In general, pairwise relationships are profiled by the profile engine 132, in accordance with example implementations, by training machine learning classifiers using training data and subsequent real time data to create classifications (scores, score classifiers, and so forth) of the pairwise relationships. In accordance with example implementations, the pairwise relationships are their corresponding classifications may be represented by corresponding tables and in general, may be represented by one or multiple graphs 136. In general, the graph 136 is a mathematical structure that is used to model the pairwise relations between objects and refers to a graph in the context of graph flow theory that includes vertices, or nodes, which are connected by edges. In this manner, a node may represent an email address or may represent a collection of email addresses associated with a particular domain. An edge extends between two nodes and represents the relationship between the nodes. In accordance with example implementations, the profiling engine 132 applies a neutral network model to rapidly score and adjust the pairwise relations in the graphs 136, thereby allowing for a relatively fast score determination (a submillisecond determination, for example), while routing millions of emails into an organizations' email system.

Figure 2A:
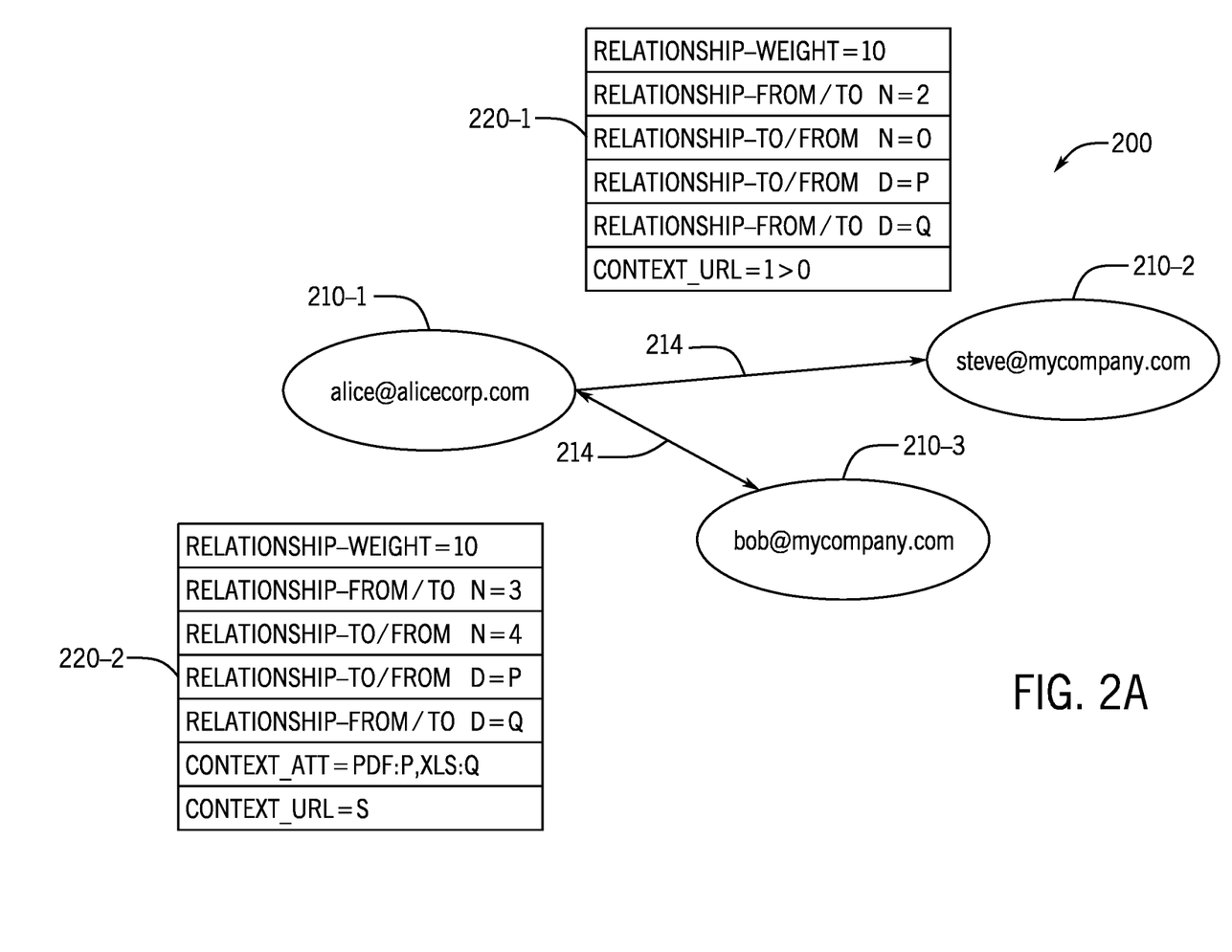
FIGS. 2A, 2B and 2C are graphs illustrating relationships between email addresses associated with non-mass mailing domains according to example implementations.

The following examples describe how the investigation engine 124 may process a given incoming email, in accordance with some implementations. For the first example, the email contains a potentially harmful attachment, as indicated by the investigation engine 124 applying the rules 128. Accordingly, the investigation engine 124 determines whether the email or a portion of the email should be quarantined and sent to the sandboxing engine 181 for analysis. FIG. 2A depicts a graph 200 (an example of one of the graphs 136) representing the relationships involved with the email: an email sender, alice@alicecorp.com, sends an email to an email recipient, bob@mycompany.com. Referring to FIG. 2A in conjunction with FIG. 1, the sender and recipient are represented by example nodes 210 of the graph, and the pairwise relationships are represented by edges 214 extending between the nodes 210.

As denoted by bidirectional example edge 214 between node 210-1 (the node for alice@alicecorp.com) and node 210-3 (the node for bob@mycompany.com) there is a two way relationship between alice@alicecorp.com and bob@mycompany.com. In this manner, FIG. 2A depicts a table 220-2 (part of the data representing the graph 220), which describes attributes of emails communicated between alice@alicecorp.com and bob@mycompany.com. The table 220-2 depicts three emails from alice@alicecorp.com to bob@mycompany.com; four emails from bob@mycompany.com to alice@alicecorp.com; P emails to alicecorp.com to mycompany.com; and Q emails from mycompany.com to alicecorp.com. Although the application of the rules 128 for this example may classify the email from alice@alicecorp.com as being a bad email, the two way relationship between alice@alicecorp.com and bob@mycompany.com has a relatively strong relationship weight (a relationship weight of "10," as set forth in table 220-2). As such, for this example, the investigation engine 124 does not quarantine the email. It is noted that FIG. 2A also depicts a table 220-1 (also part of the data representing the graph 200) depicting the pairwise relationship between allice@alicecorp.com and steve@mycompany.com.

Figure 2B:
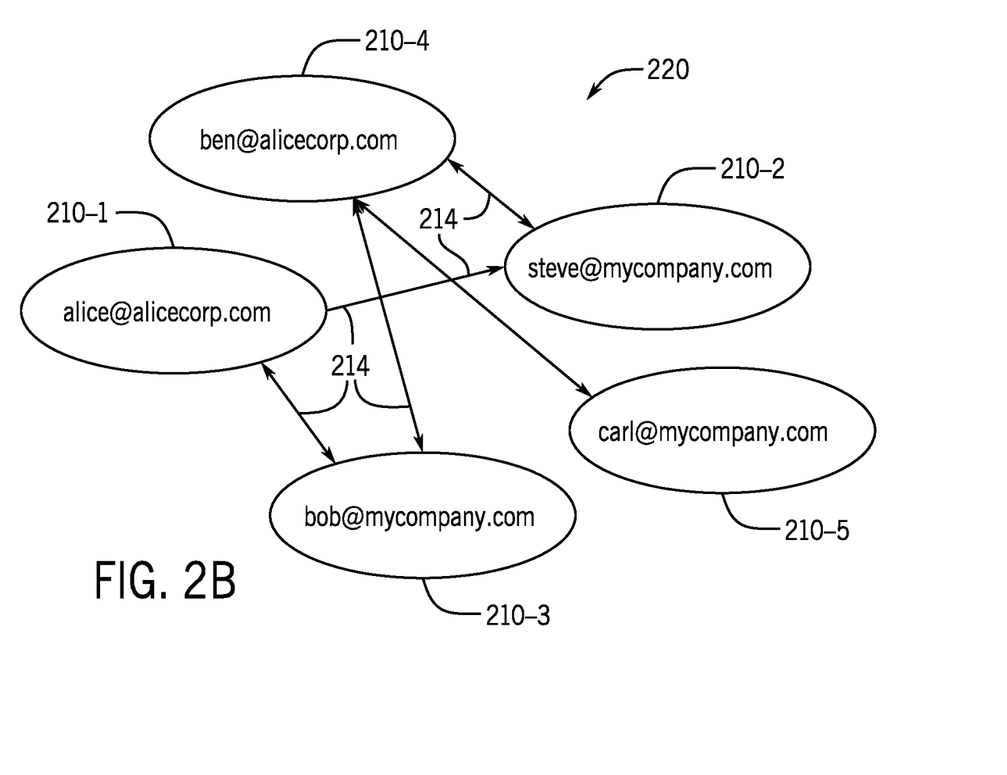
Figure 2C:
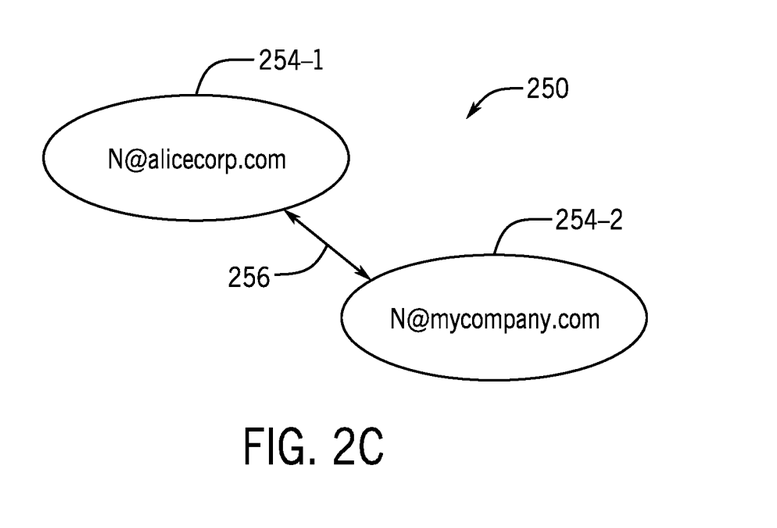

In accordance with example implementations, the investigation engine 124 does not first consider the relationships between alice@alicecorp.com and bob@mycompany.com; but instead, when evaluating the email, the investigation engine 124 may first consider the relationship between the email domain alicecorp.com and the email domain mycompany.com. In this manner, FIG. 2B depicts a graph 220 (an example graph 136) depicting pairwise relationships between senders and recipients of alicecorp.com and mycompany.com: alice@alicecorp.com (depicted by node 210-1); ben@alicecorp.com (depicted by node 210-4); steve@mycompany.com (depicted by node 210-2); bob@mycompany.com (depicted by node 210-3) and carl@mycompany.com (depicted by node 210-5. The edges 214 between the above-described nodes 210, in turn, depict the pairwise relationships and may be described by corresponding tables as discussed above for FIG. 2A. In accordance with example implementations, a graph 250 (an example graph 136) that is depicted in FIG. 2C may be used to represent the relationship between the two domains alicecorp.com and mycompany.com. In this regard, the graph 250 includes an edge 256 between nodes 254-1 (the alicecorp.com domain) and 254-2 (the mycompany.com domain). Therefore, in accordance with example implementations, due to multiple two way relationships between the two domains, the investigation engine 124 allows the potentially "harmful" emails to be sent from senders associated with the alicecorp.com domains to recipients associated with the mycompany.com domains as the domain for domain relationship score is relatively high.

Figure 3:
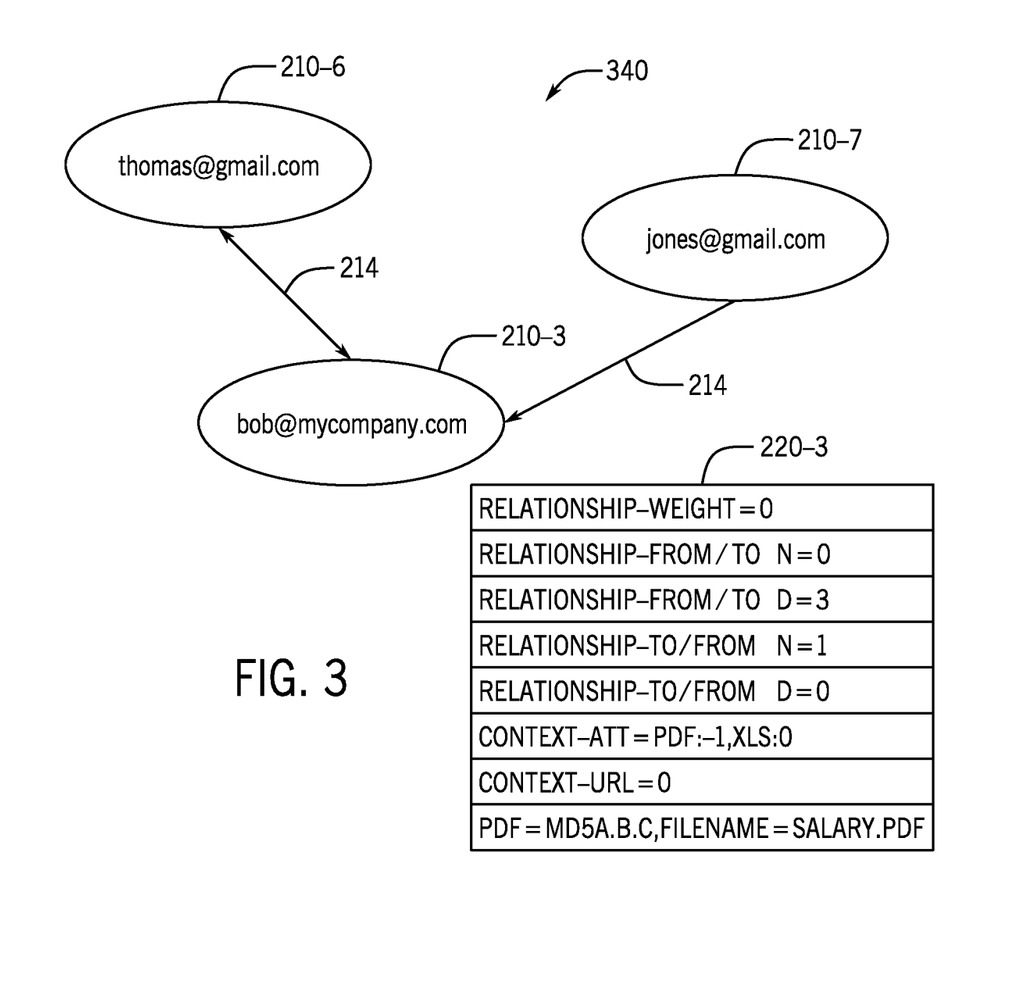
FIG. 3 is a graph illustrating relationships between email addresses associated with a mass mailing domain and email addresses associated with a non-mass mailing domain according to an example implementation.

Referring to FIG. 3, for a sender associated with a mass mailing domain, such as sender thomas@gmail.com (associated with node 210-6), the investigation engine 124 may not consider domain relationships. For the example in FIG. 3, the sender thomas@gmail.com sends an email to a recipient bob@mycompany.com (associated with the node 210-3). The email may contain an attachment, such as a .pdf attachment, which may potentially contain malware. The investigation engine 124 labels the email as being a potentially "bad" email based on the attachment type being a .pdf file.

In a similar manner, if the email contained embedded program code, such as embedded URL code, then the investigation engine 124 may label the email as being a bad email. For the case in which the sender is associated with a mass mailing domain, such as the gmail.com domain associated with the thomas@gmail.com sender, then the server agent 120 may not consider domain relationships but instead may, in accordance with example implementations, determine the relationship between specific email addresses. Thus, here, the investigation engine 124 may consider the relationship weight between the specific sender email address, thomas@gmail.com, and the specific recipient address, bob@mycompany.com. The relationship between thomas@gmail.com and bob@mycompany.com is relatively strong, due to a two way relationship existing between these two email addresses. In this case, the investigation engine 124 does not perform any further analysis and does not quarantine the email.

FIG. 3 also depicts an email from jones@gmail.com (associated with node 210-7) to bob@mycompany.com (associated with node 210-3). As shown in FIG. 3, these entities have a one way relationship. Moreover, for this example, the investigation engine 124 may identify the email as a bad email (via application of the rules 128), due to the email containing a .pdf file attachment. Based on the relationship context, the investigation engine 124 does not consider the relationship between the domains, due to the email being sent from a mass mailing domain. The relationship represented by the edge 214 is represented by a table 220-3. For this example, jones@gmail.com has attempted to send one previous email to bob@mycompany.com, and it appears that the previous attachment contained a .pdf file. Further context indicated by table 220-3 shows that a previous pdf=MD5A.B.C and filename=salary.pdf was found to be bad through the sandboxing malware analysis by the engine 181. For this example, although the server agent 120 may forward the message body to bob@mycompany.com, the agent 120 may quarantine the attachment with a low priority analysis. The low priority analysis for this example, denotes that sandboxing will take place at some point to update the machine learning with contextual information from the attachment. The email message transmitted to bob@mycompany.com informs the recipient that jones@gmail.com has previously sent a bad attachment, and as bob@mycompany.com does not appear to have a relationship with jones@gmail.com, the attachment was quarantined with an expected result within a certain timeframe (within one business day, as an example). In accordance with example implementations, the server agent 120 may provide an override to the safety mechanism so that a user @mycompany.com such as the user associated with the bob@mycompany.com account, may override the safety mechanism to receive the attachment if the user was expecting to receive the email attachment.

Referring to FIG. 1, the following is an example of the processing of an email sent from steve@lure.com to bob@mycompany.com, illustrating how sandboxing and URL filtering may be used and illustrating interactions of the components of the private computer network 101. An email is sent from steve@lure.com (originating with the external server 154), and this email has a potentially harmful web link as identified by the investigation engine 124 applying the rules 128. The investigation engine 124 may next determine the relationship between the lure.com and mycompany.com domains. For this example, none exists, so the investigation engine 124 may conduct a deeper search for the relationship between steve@lure.com and bob@mycompany.com where it is found that no relationship exists here as well.

Due to no relationship existing, the server agent 120 may subsequently perform three parallel functions. The investigation engine 124 first sends an application programming interface (API) update to proxy server URL filtering 179 (provided by proxy server 180) to block access to an embedded URL (evil.com) that was found in the email. The investigation engine 124 also, in parallel, makes a submission to the sandboxing malware analysis engine 181 to analyze the URL. Lastly, in parallel, the investigation engine 124 sends an email message (a redacted version of the original email) to bob@mycompany.com with an amendment warning the recipient that the URL has been blocked pending investigation. The investigation engine 124 may also embed an URL in the email sent to bob@mycompany.com allowing the recipient to override the safety mechanism to unblock access to the evil.com website if the recipient was expecting his email from steve@lure.com. If the override option is selected, the investigation engine 124 may send another update to the proxy server API to remove the block, and the malware analytics may still take place regardless of whether the override option was selected.

In accordance with example implementations, the sandboxing engine 181 may perform its analysis based on a queue ordering (first in first out ordering, for example) or may perform its analysis based on priority. If for the specific example of analyzing the URL, the results of analysis reveal that the URL is harmful, the investigation engine 124 may send an update email to bob@mycompany.com informing the recipient that the URL is found to be bad and will be blocked; and the profiling engine 132 may add this context is added to the profile for steve@lure.com. If, however, in accordance with example implementations, the result of the analysis found the URL to not be harmful, the investigation engine 124 may send an update to bob@mycompany.com to inform the recipient that the URL is safe to access should the recipient wish to do so; an update is made by the investigation engine 124 to the proxy server 180 to unblock the URL; and subsequently, the profiling engine 132 may add the corresponding context to the steve@lure.com profile.

Figure 4:
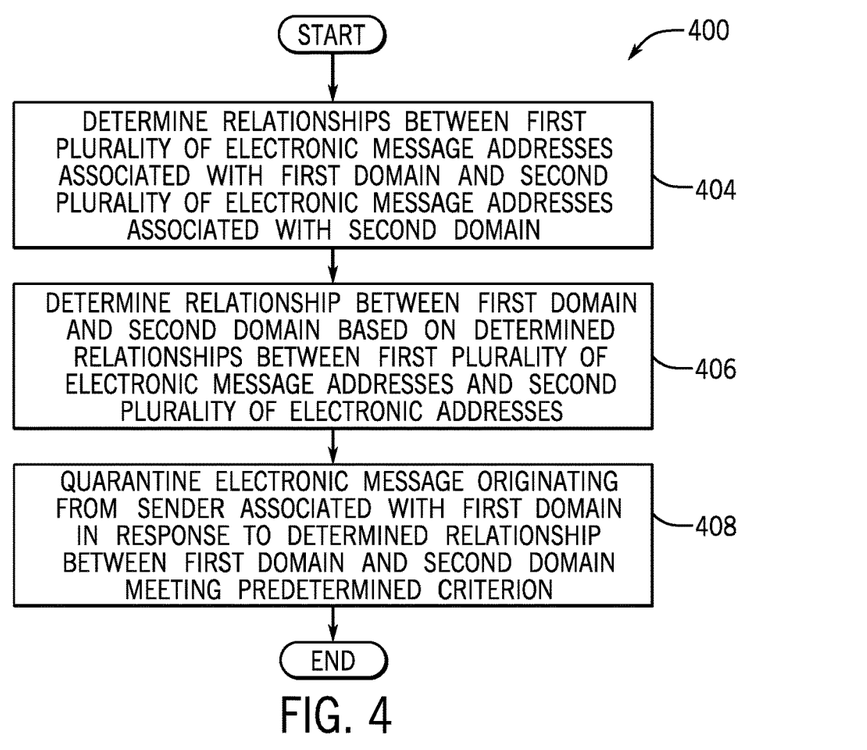
FIGS. 4 and 5 are flow diagrams depicting techniques to quarantine electronic messages according to example implementations.

Thus, referring to FIG. 4, in accordance with example implementations, a technique 400 includes determining (block 404) relationships between a first plurality of electronic message addresses associated with a first domain and a second plurality of electronic message addresses associated with a second domain. The technique 400 includes determining (block 406) a relationship between the first domain and the second domain based on the determined relationships between the first plurality of electronic message addresses and the second plurality of electronic addresses; and quarantining (block 408) an electronic message originating from a sender associated with the first domain in response to the determined relationship between the first domain and the second domain meeting a predetermined criterion.

Figure 5:
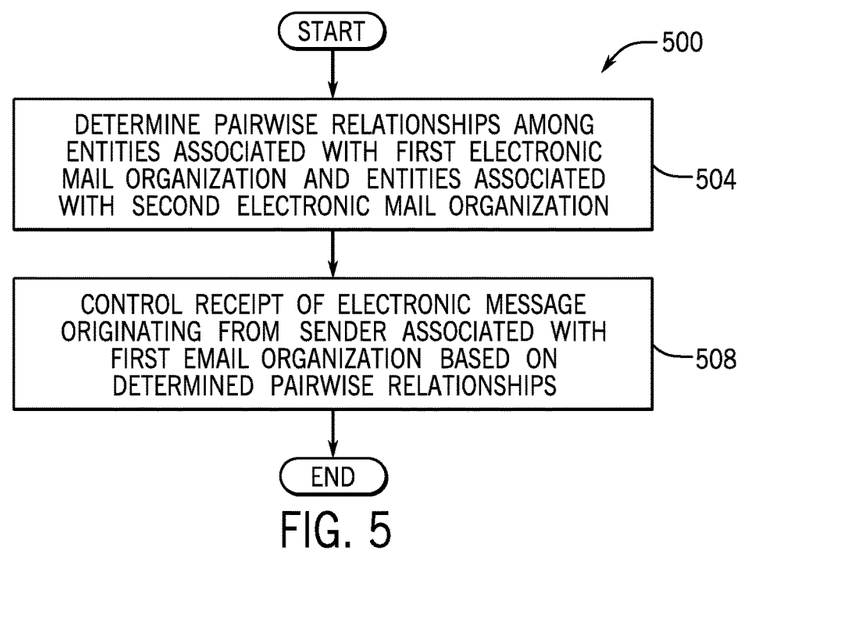

In accordance with example implementations, a technique 500 (FIG. 5) includes determining (block 504) pairwise relationships among entities that are associated with a first electronic mail organization and entities that are associated with a second electronic mail organization and controlling (block 508) receipt of an electronic message originating from a sender associated with the first email organization based on the determined pairwise relationships.

Figure 6:
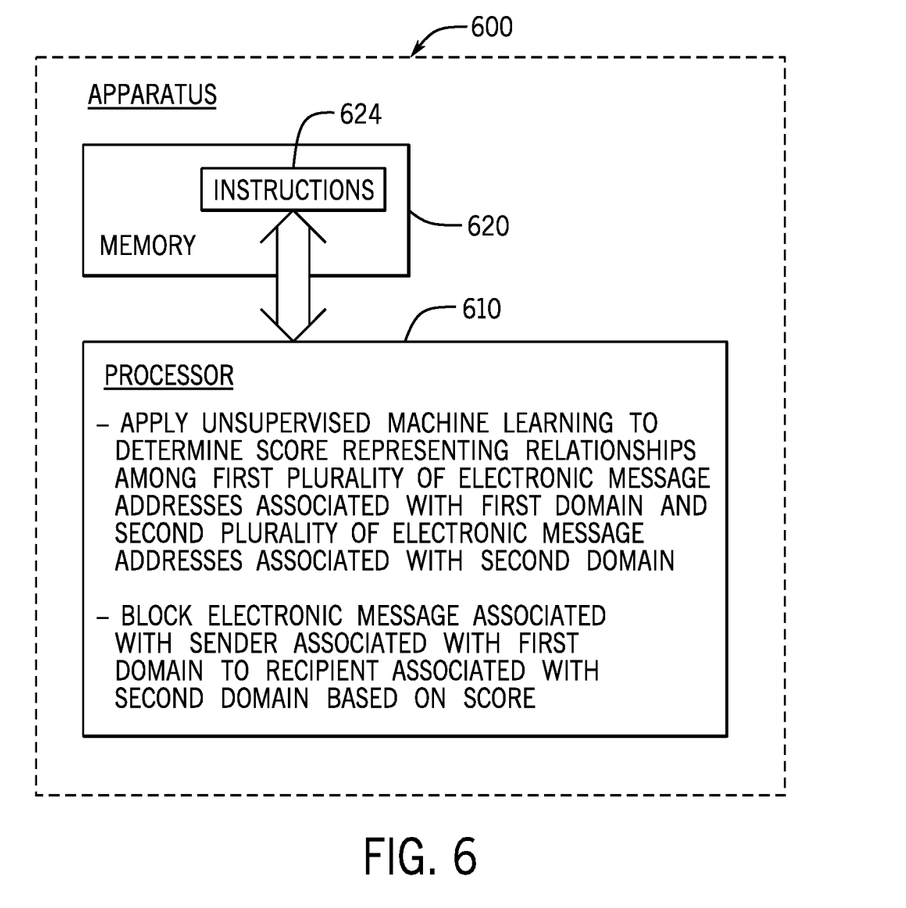
FIG. 6 is a schematic diagram of an apparatus to quarantine an electronic message according to an example implementation.

In accordance with example implementations, an apparatus 600 that is depicted in FIG. 6 includes a processor (610) and a memory 620 to store instructions 624 that when executed by the processor 610 cause the processor to apply unsupervised machine learning to determine a score representing relationships among a first plurality of electronic message addresses associated with a first domain and a second plurality of electronic messages that are associated with a second domain. The instructions 624, when executed by the processor 610, causes the processor 610 to block transmission of an electronic message associated with a sender associated with the first domain to a recipient associated with the second domain based on the score.

While the present disclosure has been described with respect to a limited number of embodiments, those skilled in the art, having the benefit of this disclosure, will appreciate numerous modifications and variations therefrom. It is intended that the appended claims cover all such modifications and variations.

What is claimed is:

1. A method comprising:
   determining relationships between a first plurality of electronic message addresses associated with a first domain and a second plurality of electronic message addresses associated with a second domain, wherein determining the relationships between the first plurality of electronic message addresses associated with the first domain and the second plurality of electronic message addresses associated with the second domain comprises:
   identifying a one-way communication between the first plurality of electronic message addresses and the second plurality of electronic message addresses;
   assigning a first weight to the one-way communication;
   identifying two-way communications between a first given message address of the first plurality of electronic message addresses and a second given message address of the second plurality of electronic message addresses; and
   assigning a second weight to the two way communications based on a number-based criterion for the two-way communications such that the number-based criterion causes the second weight to correspond to a relatively higher strength for the two-way communications for a relatively larger number of the two-way communications and causes the second weight to correspond to a relatively lower strength for the two-way communications for a relatively smaller number of the two-way communications;
   determining a relationship between the first domain and the second domain based on the first weight and the second weight; and quarantining an electronic message originating from a sender associated with the first domain in response to the relationship between the first domain and the second domain meeting a second criterion.

2. The method of claim 1, wherein the electronic message is associated with an electronic message address of the first plurality of electronic message addresses.

3. The method of claim 1, wherein quarantining the electronic message comprises:
isolating an attachment associated with the electronic message in a sand box; and
analyzing the attachment in the sand box.

4. The method of claim 1, wherein quarantining the electronic message comprises executing Uniform Resource Locator (URL) code associated with the electronic message in a sand box.

5. The method of claim 1, wherein determining the relationships between the first plurality of electronic message addresses and the second plurality of electronic message addresses comprises:
storing data representing a graph,
wherein the graph comprises nodes representing the first plurality of electronic message addresses and the second plurality of electronic message addresses, and the graph comprises edges extending among the nodes and representing pairwise relationships among the electronic message addresses associated with the nodes to which the edges connect.

6. The method of claim 1, wherein determining the relationships between the first plurality of electronic message addresses and the second plurality of electronic message addresses comprises determining categories characterizing attachments communicated among the first plurality of electronic message addresses and the second plurality of electronic message addresses.

7. The method of claim 1, wherein determining the relationships between the first plurality of electronic message addresses and the second plurality of electronic message addresses comprises determining whether embedded Uniform Resource Locator (URL) code has previously been communicated in a message associated with an electronic message address of the first plurality of electronic message addresses.

8. The method of claim 1, wherein determining the relationships between the first plurality of electronic message addresses and the second plurality of electronic message addresses comprises applying an unsupervised machine learning classification.

9. The method of claim 1, wherein determining the relationships between the first plurality of electronic message addresses associated with the first domain and the second plurality of electronic message addresses associated with the second domain comprises:
determining relationships between a first plurality of electronic message addresses associated with a first domain and a second plurality of electronic message addresses associated with a second domain:
determining a score based on the first weight and the second weight.

10. The method of claim 1, wherein quarantining the electronic message comprises performing a sandbox analysis on the electronic message.

11. The method of claim 1, wherein quarantining the electronic message comprises:
communicating a message to an intended recipient associated with the electronic message.

12. The method of claim 1, further comprising:
applying a rule to the electronic message; and
allowing the electronic message to propagate to an intended recipient of the electronic message based on a result of applying the rule.

13. The method of claim 12, wherein applying the rule comprises characterizing an attachment or an embedded program code associated with the electronic message.

14. An apparatus comprising:
a processor; and
a memory to store instructions that, when executed by the processor, cause the processor to:
apply unsupervised machine learning to determine relationships between a first plurality of electronic message addresses associated with a first domain and a second plurality of electronic message addresses associated with a second domain, wherein the application of the unsupervised machine learning comprises:
identifying a one-way communication between the first plurality of electronic message addresses and the second plurality of electronic message addresses;
assigning a first weight to the one-way communication;
identifying two-way communications between a first given message address of the first plurality of electronic message addresses and a second given message address of the second plurality of electronic message addresses;
assigning a second weight to the two-way communications based on a number-based criterion for the two-way communications such that the number-based criterion causes the second weight to correspond to a relatively higher strength for the two-way communications for a relatively larger number of the two-way communications and causes the second weight to correspond to a relatively lower strength for the two-way communications for a relatively smaller number of the two-way communications;
determine a relationship between the first domain and the second domain based on the first weight and the second weight; and
block transmission of an electronic message associated with a sender associated with the first domain to a recipient associated with the second domain based on the relationship between the first domain and the second domain.

15. The apparatus of claim 14, wherein the instructions, when executed by the processor, further cause the processor to:
apply a rule to the electronic message; and
block transmission the electronic message based on a result of applying the rule.

16. The apparatus of claim 15, wherein the instructions, when executed by the processor, further cause the processor to characterize an attachment or an embedded program code associated with the electronic message, and apply the rule based on the processor characterization.

17. The apparatus of claim 14, wherein the instructions, when executed by the processor, further cause the processor to determine pairwise relationships among the first plurality of electronic message addresses and the second plurality of electronic message addresses.

18. An article comprising a non-transitory machine readable storage medium storing instructions that, when executed by a machine, cause the machine to:

determine pairwise relationships among entities associated with a first electronic mail organization and entities associated with a second electronic mail organization, wherein determining the pairwise relationships comprises:

identifying two-way communications between a first message address of the first electronic mail organization and a second message address of the second electronic mail organization; and assigning a weight to the two-way communications based on a number-based criterion for the two-way communications such that the number-based criterion causes the weight to correspond to a relatively higher strength for the two-way communications for a relatively larger number of the two-way communications and causes the weight to correspond to a relatively lower strength for the two-way communications for a relatively smaller number of the two-way communications;

determine a relationship between the first electronic mail organization and the second electronic mail organization based on the weight; and quarantine an electronic message originating from a sender associated with the first electronic mail organization in response to the relationship between the first electronic mail organization and the second electronic message mail organization meeting a second criterion.

19. The article of claim 18, wherein the instructions, when executed by the machine, further cause the machine to apply a machine classification to data representing the pairwise relationships to determine a classification of the electronic message and control a receipt of the electronic message based on a result of the classification.

20. The article of claim 18, wherein the instructions, when executed by the machine, further cause the machine to perform quarantining of the electronic message based on the pairwise relationships in response to a determination that the first electronic mail organization is not associated with a mass mail domain.

* * * * *